Feb. 12, 1935.  F. R. HIGLEY  1,991,094
VEHICLE DRIVE
Filed Jan. 10, 1933
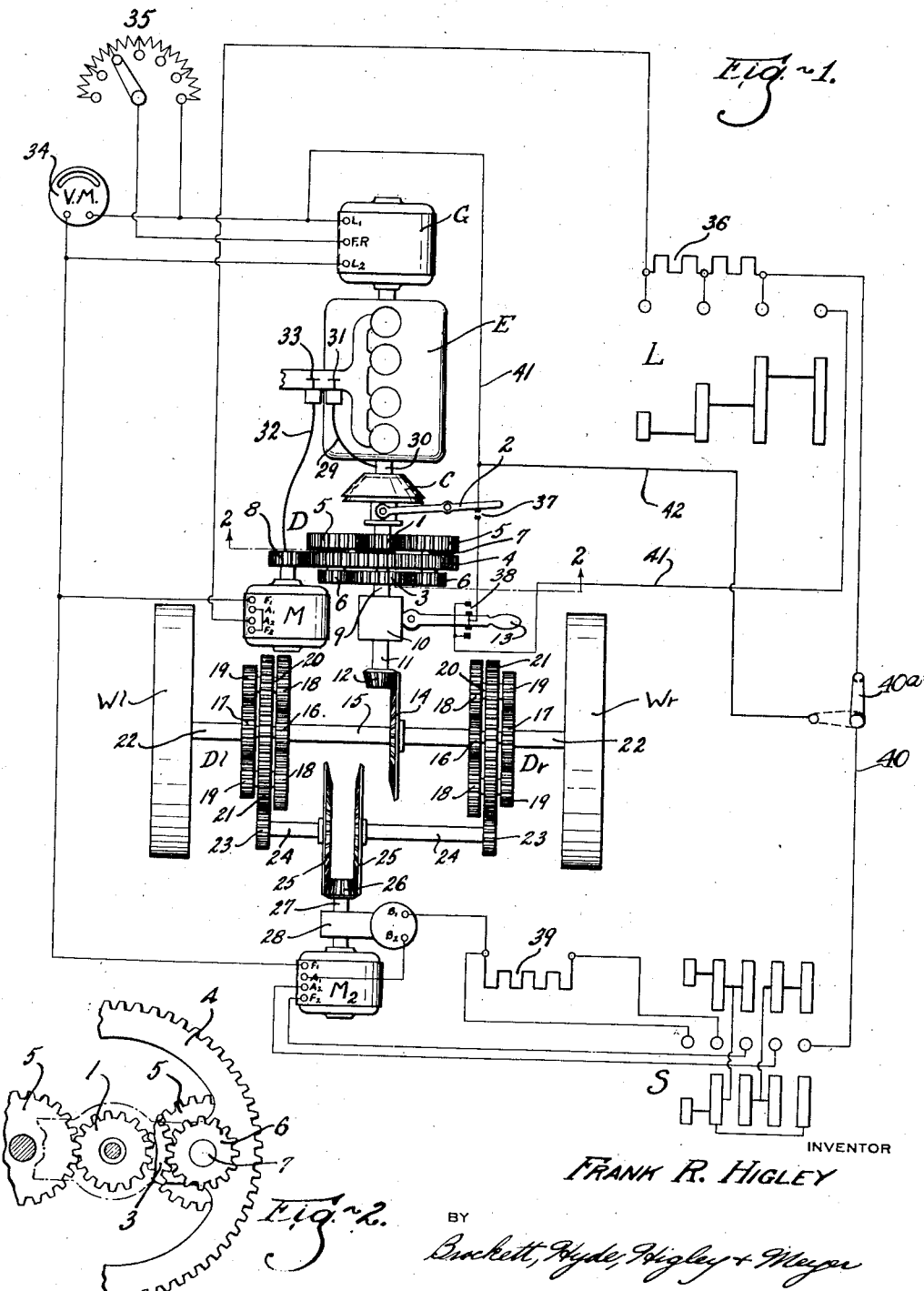
INVENTOR
FRANK R. HIGLEY
BY
ATTORNEYS Patented Feb. 12, 1935

1,991,094

UNITED STATES PATENT OFFICE 1,991,094

VEHICLE DRIVE

Frank R. Higley, Cleveland Heights, Ohio

Application January 10, 1933, Serial No. 650,959

17 Claims. (Cl. 180—17)

This invention relates to driving control means adapted for employment where a pair of elements are to be driven from a common source of power, with a drive characterized by a common control of the two elements in some respects, such as in effecting a driving connection for the two elements with their power source, and also characterized by an auxiliary control by which the relative speed of the two elements may be varied, to increase the speed of one element as that of the other is diminished.

The invention lends itself to self-propelled vehicle applications where a pair of driving traction elements are employed, one at either side of the vehicle. In such an arrangement the invention provides a driving control effective on both traction elements to drive them together, to effect locomotion of the vehicle, and the invention also provides an auxiliary control effective simultaneously but in opposite directions upon the two traction elements, whereby steering of the vehicle may be had. According to the invention, the steering control of the traction elements is in a sense superimposed upon their driving control, so that the energization of the traction elements under the driving control is modified, at the will of the operator, through the use of the steering control.

The invention contemplates an engine for driving the vehicle, a generator driven by the engine, motor means arranged to be driven by the generator under operator control, and differential means interconnecting said elements with the traction elements; the arrangement being generally one whereby varying portions of the engine output, under operator control, may be applied to the traction elements by way of the generator, motor, and differential parts, the remaining power delivered from the engine to the traction elements being by way of the differential means. Preferably the generator and motor means are electrical so that the adjustments of their relations may be effected without material interruption to torque, and the result upon the traction elements is a perfect control thereof, with drive continuous through the entire power range, varied exactly as desired with extreme ease by the operator, greatly increasing his productiveness, if the vehicle be commercially engaged, and with a yielding characteristic whereby the usual shocks and jerks are eliminated, both upon the operator and upon the parts of the vehicle itself and whatever may be drawn thereby. These advantages indicate the general objects of the invention.

The exact nature of this invention, together with further and more particular objects and advantages thereof, will be apparent from the following description taken in connection with the accompanying drawing, in which Fig. 1 is a plan view largely diagrammatic and otherwise conventionalized, illustrating an embodiment of the invention as applied to a heavy duty tractor vehicle; and Fig. 2 is an enlarged section as in the planes of line 2—2, Fig. 1, showing details of the differential type chosen for illustration.

With reference now to the drawing, W1 and Wr are the traction elements and E is the engine by which they are to be driven. The traction elements may be simply wheels or they may be the driving sprocket wheels of a type of wheel substitute, such as crawler tread linkages. The engine and other parts to be described are mounted on the usual frame which in turn is supported by the traction elements. For simplicity of illustration no frame is shown, such means for associating the parts being old and well known in many forms in the art and comprising no part of the present invention.

A generator G is arranged to have continuous drive from the engine, either by the direct connection indicated or through suitable gearing, dependent upon speed limitations of the parts. The input element 1 of a driving differential D is arranged to have drive from the engine through clutch means C controlled by the lever 2.

The driving differential has a pair of differentially related input elements and an output element arranged to be differentially driven therefrom. The form of differential chosen for illustration comprises an epicyclic spur gear train. Its input element 1 is a pinion concentric with the gear 3, which is the output element of the differential. An intermediate member 4 carries a number of gear pairs each comprising a gear 5 meshing with the input pinion 1 and a pinion 6 meshing with the output gear 3. Each gear 5 is fixed with its pinion 6, as secured on the shaft 7 therebetween, the shafts 7 being carried by the member 4 and free to rotate therein. Thus were the member 4 fixed, the output gear 3 would be driven by the input pinion 1, at a reduced speed, through the gears 5, shafts 7 and pinions 6.

Means are provided for operating the member 4 from a part of the engine output diverted from the differential input member 1, by way of the generator G. To this end a motor M has driving connection with the differential member 4 by an arrangement here shown as comprising a pinion 8 on the motor shaft, meshing with teeth provided peripherally of the member 4.

The capacity of the generator G is such that it may take a relatively small part of the output of the engine E, say one-third. The capacity of the motor M is such that it may take substantially the entire output of the generator G. Connections to be described are provided for operating the motor from the generator, under operator control. It will be apparent that the differential output element 3 will have drive not only from the engine-driven input element 1 but also from the motor-driven element 4 which, it will be seen, comprises a second input element of the differential; the speed and direction of the output element 3 being differentially related, dependent upon those of the two input elements 1 and 4.

The differential output element 3 is connected as by a shaft 9 with a reverse gear 10, connected as by shaft 11 with a bevel pinion 12 for drive of the latter. The reverse gear 10 is controlled as by a lever 13, and it will be understood that there are three conditions of the reverse gear parts with corresponding positions of the lever 13: a forward one wherein the pinion 12 will be driven in the same direction and preferably at the same speed as the gear 3; a reverse one in which the bevel pinion will be driven by the gear 3 but in the opposite direction; and a neutral position intermediate the forward and reverse positions in which there will be no drive. The lever 13 is shown as in the neutral position.

The pinion 12 meshes with the gear 14, mounted on transverse shaft 15, each end of which carries a pinion 16 which constitutes the input element of one of the differentials generally indicated at D1 and Dr. These differentials are identical with each other and generally similar to the differential D.

With reference to the differential D1, a gear 17 is disposed opposite the pinion 16, and comprises the output element of the differential. Gears 18 meshing with the pinion 16, and pinions 19 meshing with the gear 17, are fixed upon shafts 20 carried by a member 21. The member 21 comprises the second input element of the differential D1, and the arrangement is obviously one whereby the output element 17 may have coincidental drive by the input elements 16 and 21 in differential relation. The proportion and arrangement of the parts is such that if the input element 21 be stationary the output element 17 will be driven by the input element 16 at reduced speed, whereas if the input element 16 be stationary, the output element 17 may be driven by the other input element 21 but at much reduced speed.

The output element 17 of the left-hand differential D1 has positive driving connection with the left-hand traction or wheel means Wl through the axle shaft 22. The right-hand traction means Wr similarly has driven connection with the output element of the right-hand differential Dr. Obviously each of the differentials D1, Dr, has an input element 16 driven by the engine by way of the pinion 12, and the drive is coincidental for both these input elements, as to both speed and direction.

Means are provided for coincidental drive of the other input elements 21 of these differentials, at the same speed but in opposite directions. For this purpose these members are here shown as peripherally toothed to mesh the pinions 23 on aligned shafts 24. Each of these shafts carries a bevel driving gear 25, both gears meshing with a pinion 26. The pinion in turn is arranged to be driven by a steering motor M2 through a shaft 27.

It will be apparent that operation of the motor M2, acting through the described gearing, will cause coincidental actuation of the second input elements 21 of the differentials D1 and Dr in opposite directions. Thus by operation of the motor M2 if the shaft 15 be stationary, the traction means on the opposite sides of the vehicle will be caused to move simultaneously, at much reduced speed and in opposite directions. And if the shaft 15 and consequently the traction means be already moving, operation of the motor M2 will have the effect of superimposing on each of the traction means but in opposite directions, a motion which is positive upon one of the traction means, to speed it up, and negative upon the other traction means to slow it down.

The motor M2 is a reversing one and arranged to have drive from the generator G under control of the operator, as will be described.

That the second input elements 21 of the differentials D1 and Dr be maintained stationary except when their actuation is desired, brake means 28 are associated with the shaft 27 and arranged for automatic application and release dependent upon operation of the motor M2. As here indicated the brake means 28 is electrically operated, in circuit with the motor M2 and so arranged as to have automatic release while the motor is in operation and to be applied at all other times. Such electric brakes are old and well known and their details immaterial here.

As is usual in the art the engine E is governor controlled, as by the governor indicated at 29 as associating the engine crank shaft 30 with the engine throttle 31, to maintain the engine operating at a substantially constant speed.

In order to prevent overspeeding of the motor M, second governor means 32 may be arranged responsive to the speed of the motor M, to control a throttle 33. The governor means 32 is preferably arranged to be responsive to the speed of the motor regardless of the direction of motor operation, so that upon approach of the input element 4 of the differential D, and consequently approach of the motor M, to excessive speed, the speed of the differential input element 1 will be reduced as necessary.

With reference now to the electrical part of the system, which may preferably employ direct current as indicated, the generator G is arranged to operate at its rated capacity, say one-third of the engine capacity, when the engine is operating at its normal speed maintained by its governor 29. The generator is preferably of shunt characteristics although it may be compound wound. In any event a voltmeter 34 and a variable resistance 35 are arranged as well understood in the art, for control of the excitation of the generator field winding and consequently for control of the generator output voltage at its driven speed.

The motor M is arranged to be driven at that voltage by the generator, preferably subject to the setting of a locomotion controller generally indicated at L and indicated as of the drum type with two resistance stages 36. Since the motor M need not be reversed in its connection with the generator, the controller L is quite simple. Indeed both this controller and the remainder of the circuit connecting the motor and generator are so elementary and well known in the art that it is unnecessary to add written description to the showing of the circuit as it appears in the drawing, or to add reference characters thereto, except as follows.

That operation of the motor be dependent upon operation of the clutch C, the two are interassociated by switch means conventionally indicated at 37 as immediately associated with the clutch control lever 2, in the circuit between motor and generator, whereby the motor may not have drive from the generator except during engagement of the clutch C.

Similarly, that operation of the motor be dependent upon positioning of the reverse gear 10 for drive in either forward or reverse directions, the two are interassociated by switch means conventionally indicated at 38 as immediately associated with the reverse lever 13 and of two-way type, in the circuit between motor and generator, whereby the motor may not have drive from the generator except coincident with positioning of the reverse control lever 13 in either forward or reverse position.

It will be noted that the switches 37 and 38 are in series relation with respect to the generator-motor circuit so that upon opening of either switch the circuit will be open, and to complete the circuit requires coincident closing of both switches. Thus regardless of the setting of the controller L, current will not be supplied to the motor M unless the reverse gear 10 has been set to provide either forward or reverse drive, and at the same time the clutch C is engaged. Consequently the motor M may not be supplied with current unless and until there is a load upon it.

While the operation of the motor M has been illustrated and described as immediately controlled by the controller L, it will be understood by one familiar with the art that the controller L might be eliminated, and the motor M be immediately controlled instead, simply by varying the generator output, by adjustment of the resistance 35. The particular manner of immediate control of the motor is largely a matter of choice in the electrical design, and will be governed by the particular conditions designed to be met by the particular vehicle under consideration.

The motor M is preferably of series type, and its arrangement is of course such that its torque is always exerted in a direction to cause or tend to cause actuation of the intermediate differential member 4 in the direction of operation of the differential element 1.

With reference now to the motor M2, this is preferably also of the series type, arranged to operate at the generator output voltage. It is provided with a reversing controller S conventionally indicated as of the usual drum type, having the associated resistance 39, and as already described is in circuit with the electrical brake 28.

The motor M2 is arranged to have drive from the generator G subject to the controller S.

The motor M2 may be of much smaller capacity than the motor M as indicated, in which event it is preferable that the circuit of the motor M2 be made dependent upon the circuit of the motor M, so that operation of the motor M2 may only be had during driving operation of the motor M. Such circuit arrangement is indicated in the drawing, wherein the line 40 leading to the controller S of the motor M2 is connected dependent upon the line 41 for the motor M in which the switches 37 and 38 and the controller L are located. Otherwise the motors M and M2 are in parallel circuits with respect to the generator G.

On the other hand, in some applications, as where it is desired to turn the vehicle without advancing it, it will be preferable that the motor M2 be of greater capacity. In such event it will be unnecessary that the circuit of the motor M2 be made dependent upon operation of the motor M, and instead the motor M2 circuit may be a direct one from the generator G independent of the circuit of the motor M. Such a circuit would be obtained by throwing the switch 40a from its full line to its dotted line position, to establish connection between lines 40 and 41 by way of line 42. In this event it will also be preferable that the controller S of the motor M2 have more than the one stage of resistance 39 indicated, all as will be appreciated by one familiar with the art. It will be appreciated that in actual practice there will usually be no switch such as indicated at 40a; instead, the line 40 will have but one of the two connections here shown as controlled by the switch, and such connection will be a permanent one.

Operation will be as follows, assuming the engine E in operation at its working speed, maintained by its governor 29, the generator G consequently being driven by the engine, and the resistance 35 set to provide that the generator G deliver the proper voltage at that speed; the parts being otherwise as indicated. Assuming the vehicle to be stationary, none of the gears are in motion.

To cause the vehicle to advance, the reverse lever 13 is thrown forward to set the reverse gears in forward driving position. This closes the switch 38 in the ahead direction. The clutch C is next engaged by manipulation of its lever 2, which closes the switch 37. Engagement of the clutch puts the input element 1 of the differential D in motion, which, acting through the differential gears 5 and pinions 6, against the differential output gear 3, sets the differential member 4 in motion in reverse direction, the vehicle remaining stationary since its load is greater than the mere inertia load provided by the armature of the motor M. Consequently the differential member 4, acting through the pinion 8, drives the motor in reverse direction.

The controller L is next advanced to its first driving position to connect the motor M with the generator G through both resistance elements 36. This causes the motor M, formerly being idled in reverse direction, to exert a torque in ahead direction in opposition to the motion of its connected differential input member 4, slowing down the motor and differential member, the motor in effect acting as a brake. As the second differential input element 4 slows down, the other input element 1 continuing to be driven at constant speed by the engine E, the output element 3 of the differential is put into motion, in the direction in which the input element 1 is moving. This motion is transmitted through the reverse gear 10, shaft 11, pinion 12, gear 14 and shaft 5 to the input elements 16 of the two differentials D1 and Dr. From the input elements 16 the motion is transmitted to the wheel means Wl and Wr through their respective differentials, since the other input elements 21 of these differentials are fixed.

The motion of the input element 1 of the first differential D is at first much greater than that of its output element 3, owing to the series characteristics of the motor M. As the latter slows down the differential output element 3 is speeded up, causing the vehicle to start to advance, as will be described. Ultimately the motor M, owing to its series characteristic, will decelerate its reverse speed, pass through a standstill condition and commence to operate in ahead direction as in the usual condition of motor operation; the controller L being possibly meanwhile advanced to full speed ahead position placing the motor directly across the generator output line. At the same time, the engine maintaining its constant speed, the differential output element 3 increases its speed until ultimately all of the differential gears are moving at the same speed about the center line of the differential, and none have tooth motion, at which time the reverse gear 10 is being driven at engine speed.

Preferably the parts of the differential D are so proportioned and arranged that the relative leverages afforded the engine and the motor upon the output element 3 of the differential, are in accord with the relative capacities of the motor, and of the engine less the generator. Thus if the generator and motor capacities be one-third of the engine capacity as suggested above, the differential is so arranged that the motor has half the leverage that the input element 1 has upon the output element. The desirability of such general proportioning will be apparent, although in certain applications, as where it may be desirable that the motor overrun the engine, the proportioning may be such that the motor has more leverage and the engine less, as will be appreciated.

Should the controller L not be advanced to full speed position, at either of its two lower driving settings, the reverse gear will be driven at correspondingly slower speeds.

As already noted, the drive from the reverse gear is transmitted to the wheel means W1 and Wr by way of the bevel gears 12 and 14, and the respective traction differentials D1 and Dr. There will be a reduction of speed at each of these traction differentials because for each, while one of its input elements 16 has drive from the driving differential D, its second input element 21 is maintained stationary by the gearing with which it is connected to the motor M2. The wheel means will thus be actuated coincidentally in the ahead direction, positively, and at a speed much below, but dependent directly upon, that of the output element 3 of the driving differential.

The reactions through the pinions 23 by which the traction differential input elements 21 are maintained stationary, act in opposite directions upon the pinion 26 and thus substantially neutralize each other. The brake 28 effective upon the pinion 26 positively prevents any difference in speed between the two traction means on the opposite sides of the vehicle, as should one only meet with an obstruction.

Should it be desired to steer the vehicle, while in locomotion, as to the right in the drawing, the steering controller S is adjusted by the operator to start the motor M2 in left-hand direction in the drawing. Coincidentally and automatically releasing the brake 28, this actuates the gearing between the motor M2 and the two traction differential input elements 21 to advance the element of the left-hand differential D1 and correspondingly retard the element 21 of the right-hand differential Dr. Since the speed of each wheel means is the numerical sum of the speeds of the two input elements of its differential, the left-hand wheel means W1 is caused to move faster and the right-hand one Wr to move slower so that the vehicle changes its course to the right.

The operation of steering to the left will obviously follow setting of the steering controller S in the opposite direction from its neutral position. Preferably this steering controller is provided with means yieldably urging it to the neutral position, shown, and is so arranged on the vehicle that turning the controller from this position effects turning of the vehicle in the corresponding direction.

In any event since the motor M2 has series characteristics its actuation will change the course of the vehicle without any sudden material change in torque on any of the working parts, and substantially without altering the instant vehicle speed. If the vehicle be in motion there are no very great power demands on motor M2, since one of the gears 25 will always assist it in driving the other gear 25.

Obviously the faster the motor M2 is caused to operate, the shorter will be the radius of turning of the vehicle. This will depend both upon the setting of the steering controller and upon the time through which the motor M2 is allowed to accelerate. The vehicle will thus enter the travel of its curve on a path of radius commencing with infinite length and decreasing in length until the minimum is attained.

Reverse locomotion of the vehicle will obviously be the same as before with the exception that the reversing controller 13 is shifted to reverse position instead of ahead position before engagement with the clutch C.

When the vehicle is in reverse locomotion it may of course still be steered by manipulation of the steering controller S, the front end of the vehicle always moving in the direction in which the controller is turned, regardless of the direction in which the vehicle is travelling.

If the switch 40a in the circuit of the steering motor M2 be positioned as indicated in broken lines, the vehicle may be caused to turn regardless of whether or not it is otherwise in locomotion. In such event although neither the driving motor M, the clutch C nor the reverse gear 10 be functioning, but providing the engine E is driving the generator G, manipulation of the steering controller S to cause actuation of the steering motor M2 will cause rotation of the input elements 21 of the traction differentials D1 and Dr in opposite directions. The reactions upon the other input elements 16 of these being in opposite directions, the shaft 15 therebetween will maintain them stationary, and the wheel means W1 and Wr will consequently be caused to move in opposite directions and the vehicle to correspondingly turn about an axis within its own confines, in other words to move upon itself as a pivot.

In general so far as the operator is concerned it will be observed that, the clutch C being released, the engine may be allowed to continue running without damage to either the driving motor M or the steering motor M2 under any condition.

Once the reverse gear 10 and clutch C are engaged, the same is true. For, the vehicle being stationary, the engine operating subject to the governor 31 responsive to engine speed, engagement of the clutch is not followed by speeding up of the motor M since, coincident with clutch engagement, the governor 33 immediately throttles down the engine as necessary to prevent overspeeding of the motor. Then, not until the controller L is set to supply current to the motor M, and thus slow down the motor speed, does the governor 33 open its throttle to release the engine to the control of the governor 31. In other words, the controller L being open, engagement of the clutch is immediately followed by engine operation at idling speed, until the controller L be adjusted to ahead position.

In fact, the governor L may be set in first speed ahead position if desired before engagement of the clutch C, whereupon immediately the clutch is engaged, because of the coincident engagement of the switch 37, current will be supplied to the motor M and the vehicle will start forward. Such starting operation, so far as the clutch engagement is concerned, is substantially similar from the operator's point of view, to the arrangement in the usual vehicle having a sliding gear transmission. Thereafter the operator has but two things to claim his attention, namely the driving or locomotion controller L by which alone the speed of the vehicle is controlled, and the steering controller S by which alone the steering of the vehicle is controlled. The operator thus has perfect and simple control, practically without effort.

Should the conditions to be met by the vehicle materially change as to load demands upon it, this may be accommodated by adjustment of the generator field resistance 35 and of the engine governors, particularly its governor 29.

Thus where light loads are to be met, the governor 29 may be set for a lower engine speed and the resistance 35 adjusted to give the proper generator output at that speed. Thereafter, the vehicle being otherwise operated as before, the effect will be one of a smaller leverage of the engine upon the traction means, so that the vehicle will be speeded up and fuel conserved. Similarly, adjustment may be made for greater load conditions, speeding up the engine with respect to its load.

In any event it will be observed that only a relatively small part of the engine output is transmitted through the electric system, the greater portion of the output always being transmitted to the traction means through a mechanical and thus positive gearing, the working speed of its interengaging differential gear parts decreasing as the vehicle speed increases.

Under no condition will there be such shocks and sudden loads, upon the parts of the vehicle or upon such trailer equipment as may be hitched thereto, as have been considered unavoidable in the prior art where clutches and shifting gears have been made to assume and release the entire load almost continuously in operation.

By the arrangement described the speed of the vehicle is always substantially dependent upon the relation of the load to the capacity of the engine under the various conditions of operation, the vehicle always automatically speeding up as the load upon the engine is lightened for any reason. In other words the gear ratio is capable of infinite variation, and the proper gear ratio is automatically selected.

It will be observed that the essence of the invention is an arrangement whereby a large portion of the engine output is mechanically connected to the traction means for driving the latter, a smaller and variable portion of the engine output is diverted from the engine and otherwise applied to the traction means for drive thereof, and still another and variable portion of the engine output is diverted from both said first two connections and applied to the traction means in opposite directions for steering effect. Thus each of the tractor means has its drive from the engine through three largely independent channels, coordinated by a differential relation between all three channels.

While I have herein illustrated and specifically described but one basic form of the invention and with slight modifications only, it will be appreciated that the invention is capable of embodiment in many other modified forms without deviation from its fundamental concept. Thus, I am not limited to the particular type of differential means illustrated, the gear ratios indicated or the circuits made reference to herein. Moreover, as already noted, bearings and many other stationary and usual parts cooperative with those specifically illustrated, for purposes of clarity of illustration do not appear in the drawing, but are necessarily implied as will be appreciated by anyone familiar with the art.

What I claim is:

1. In a vehicle having an engine and a pair of traction means, one at each side, to be driven thereby, a pair of differentials one associated with each traction means, each differential having an input element arranged to have operator-controlled drive from the engine, and an output element arranged for drive of its traction means, each of said differentials having a second input element, and reversible means having power from said engine, under operator control, for simultaneously driving said second input elements in opposite directions, independent of the drive of said first input elements.

2. In a vehicle having an engine and a pair of traction means, one at each side, to be driven thereby, a pair of differentials one associated with each traction means, each differential having an output element arranged for drive of its traction means, and an input element, means providing a common operator-controlled drive for said input elements from the engine, each of said differentials having a second input element, and means for simultaneously driving said second input elements in opposite directions from said engine, independent of said common drive.

3. In a vehicle having an engine and a pair of traction means, one at each side, to be driven thereby, a pair of differentials one associated with each traction means, each differential having an input element, and an output element arranged for drive of its traction means, means providing a common operator-controlled drive for said input elements from the engine, each of said differentials having a second input element, a generator driven by said engine, reversing motor means arranged to be driven by said generator under operator control, and means associating said motor means with said second input elements for simultaneous drive of the latter in opposite directions.

4. In a vehicle having an engine and a pair of traction means, one at each side, to be driven thereby, a pair of differentials one associated with each traction means, each differential having an input element arranged to have operator-controlled drive from the engine, and an output element arranged for drive of its traction means, each of said differentials having a second input element, a generator arranged to be driven by said engine, a reversing motor arranged to be driven by said generator under operator control, and means associating said motor with said second input elements for simultaneous drive of the latter in opposite directions.

5. In a vehicle having an engine and a pair of traction means, one at each side, to be driven thereby, a pair of differentials one associated with each traction means, each differential having an output element arranged for drive of its traction means, and an input element, means providing a common operator-controlled drive for said input elements from said engine, each of said differentials having a second input element, and means independent of said common drive, providing a common operator-controlled steering drive for said second input elements from said engine in opposite directions.

6. In a vehicle having an engine and a pair of traction means, one at each side, to be driven thereby, a pair of differentials one associated with each traction means, each differential having an input element arranged to have drive from the engine, and an output element arranged for drive of its traction means, each of said differentials having a second input element, reversing motor means arranged for operator control, steering drive means associating said motor means with said second input elements for simultaneous drive of the latter in opposite directions, said steering drive means including an element in driving relation with both said second input elements and brake means associated with said steering drive means element.

7. In a vehicle having an engine and a pair of traction means, one at each side, to be driven thereby, a pair of differentials one associated with each traction means, each differential having an input element arranged to have drive from the engine, and an output element arranged for drive of its traction means, each of said differentials having a second input element, reversing motor means, arranged for operator control, steering drive means associating said motor means with said second input elements including an element in driving relation with both said second input elements for simultaneous drive of the latter in opposite directions, and automatic brake means for said steering drive means element associated with said motor to have release only coincident with motor operation.

8. In a vehicle having an engine and a pair of laterally spaced traction means to be driven thereby, a generator driven by the engine, a driving control motor arranged to be driven by said generator, a driving differential having a pair of input elements, one arranged to have drive from said engine and the other to have drive from said motor, a pair of traction differentials each having an output element arranged for drive of one of said traction means, each having an input element arranged to be driven by the output element of said driving differential, and each having a second input element, a reversing motor arranged to be driven by said generator under operator control, and means associating said reversing motor with said second input elements of said traction differentials for simultaneous drive of the latter in opposite directions.

9. In a vehicle having an engine and a pair of laterally spaced traction means to be driven thereby, a pair of traction differentials each having an output element arranged for drive of one of said traction means, each having an input element, said input elements being arranged to have coincidental drive from said engine, and each traction differential having a second input element, reversing motor means arranged for operator control, means associating said reversing motor means with said second input elements for simultaneous drive of the latter in opposite directions, and means preventing operation of said reversing motor except when said vehicle is being driven.

10. In a vehicle having an engine and a pair of laterally spaced traction means to be driven thereby, a pair of traction differentials each having an output element arranged for drive of one of said traction means, each having an input element, said input elements being arranged to have coincidental drive from said engine, and each traction differential having a second input element, reversing motor means arranged for operator control, means associating said motor means with said second input elements for simultaneous drive of the latter in opposite directions, and means providing that operation of said motor be dependent upon said drive of said first input elements.

11. In a vehicle having an engine and a pair of laterally spaced traction means to be driven thereby, a generator driven by the engine, a driving control motor arranged to be driven by said generator, a driving differential having a pair of input elements, one arranged to have drive from said engine and the other to have drive from said motor, a pair of traction differentials each having an output element arranged for drive of one of said traction means, each having an input element arranged to be driven by the output element of said driving differential, and each having a second input element, a reversing motor arranged to be driven by said generator under operator control, means associating said reversing motor with said second input elements of said traction differentials for simultaneous drive of the latter in opposite directions, and means providing that operation of said reversing motor be dependent upon drive of the output element of said driving differential, said output element being in differentially driven relation with said input elements of said driving differential.

12. In a vehicle having an engine and a pair of laterally spaced traction means to be driven thereby, a generator driven by the engine, a driving control motor arranged to be driven by said generator, a driving differential having a pair of input elements, one arranged to have drive from said engine and the other to have drive from said motor, a pair of traction differentials each having an output element arranged for drive of one of said traction means, each having an input element arranged to be driven by the output element of said driving differential, and each having a second input element, a reversing motor arranged to be driven by said generator under operator control, means associating said reversing motor with said second input elements of said traction differentials for simultaneous drive of the latter in opposite directions, and means providing that operation of said reversing motor shall be conditional upon operation of said driving control motor.

13. In a vehicle having an engine and traction means to be driven thereby, a generator driven by the engine, a driving control motor, means providing for drive of said motor by said generator and including switch means, a driving differential having a pair of input elements, one arranged to have drive from said engine and the other to have drive from said motor, clutch means in the drive from said engine to its said differential input element, said differential having an output element arranged to be driven by both said input elements, means associating said traction means with said differential output element to provide drive of the traction means thereby, and means interassociating said switch means with said clutch means to make closing of said switch means dependent upon engagement of said clutch means.

14. In a vehicle having an engine and a pair of laterally spaced traction means to be driven thereby, a generator driven by the engine, a driving control motor, means providing for drive of said motor by said generator and including switch means, a driving differential having a pair of input elements, one arranged to have drive from said engine and the other to have drive from said motor, a pair of traction differentials each having an output element arranged for drive of one of said traction means, each having an input element arranged to be driven by the output element of said driving differential, and each having a second input element, a reversing motor arranged to be driven by said generator under operator control, means associating said reversing motor with said second input elements of said traction differentials for simultaneous drive of the latter in opposite directions, and means associating said reversing motor with the circuit of said driving control motor whereby operation of said reversing motor shall be conditional upon operation of said driving control motor.

15. In a vehicle having an engine and traction means to be driven thereby, a generator driven by the engine, a driving control motor, means providing for drive of said motor by said generator and including switch means, a driving differential having a pair of input elements, one arranged to have drive from said engine and the other to have drive from said motor, said differential having an output element arranged to be driven by both said input elements, means, including a reverse gear, associating said traction means with said differential output element to provide drive of the traction means thereby, said reverse gear having forward, neutral, and reverse positions, and means interassociating said switch means with said reverse gear to make closing of said switch means dependent upon positioning of said reverse gear in its forward or reverse positions.

16. In a vehicle having an engine and traction means to be driven thereby, a generator driven by the engine, a driving control motor, means providing for drive of said motor by said generator and including switch means, a driving differential having a pair of input elements, one arranged to have drive from said engine and the other to have drive from said motor, clutch means in the drive from said engine to its said differential input element, said differential having an output element arranged to be driven by both said input elements, means including a reverse gear associating said traction means with said differential output element to provide drive of the traction means thereby, said reverse gear having forward, reverse and neutral positions, and means associating said switch means with said clutch means and said reverse gear to make closing of said switch means dependent upon coincident engagement of said clutch means and positioning of said reverse gear in forward or reverse positions.

17. In a vehicle having engine means and traction means to be driven thereby, differential means having a pair of differentially related input elements, one driven by said engine means, and means for diverting a portion of the engine output for driving the other differential input element thereby, governor means for said engine arranged to be responsive to the speed of the other element, and means associating said traction means with the output element of said differential means to have drive thereby.

FRANK R. HIGLEY.